US008287641B2

(12) United States Patent
Bohner

(10) Patent No.: US 8,287,641 B2
(45) Date of Patent: Oct. 16, 2012

(54) CALCIUM PHOSPHATE PARTICLES AND HYDRAULIC CEMENTS BASED THEREON

(75) Inventor: Marc Bohner, Grenchen (CH)

(73) Assignee: Dr. H.C. Robert Mathys Stiftung, Bettlach (CH)

( * ) Notice: Subject to any disclaimer, the term of this patent is extended or adjusted under 35 U.S.C. 154(b) by 175 days.

(21) Appl. No.: 12/990,744

(22) PCT Filed: May 2, 2008

(86) PCT No.: PCT/CH2008/000200
§ 371 (c)(1),
(2), (4) Date: Nov. 2, 2010

(87) PCT Pub. No.: WO2009/132466
PCT Pub. Date: Nov. 5, 2009

(65) Prior Publication Data
US 2011/0041735 A1    Feb. 24, 2011

(51) Int. Cl.
C04B 12/02    (2006.01)
(52) U.S. Cl. .......................................... 106/690; 106/35
(58) Field of Classification Search .................... 106/35, 106/690
See application file for complete search history.

(56) References Cited

FOREIGN PATENT DOCUMENTS
WO    01/41824 A1    6/2001

OTHER PUBLICATIONS

Jones, J.R. et al.; "Optimising bioactive glass scaffolds for bone tissue engineering"; Biomaterials; Elsevier Science Publishers BV.; vol. 27, No. 7; Mar. 1, 2006; pp. 964-973; XP025097052.
Baroud, G. et al.; "Rheological characterization of concentrated aqueous beta-tricalcium phosphate suspensions: The effect of liquid-to-powder ratio, milling time, and additives"; Acta Biomaterialia; Elsevier; vol. 1, No. 3; May 1, 2005; pp. 357-363; XP004973131.
Bohner, M. et al.; "Combining particle size distribution and isothermal calorimetry data to determine the reaction kinetics of alpha-tricalcium phosphate-water mixtures"; Acta Biomaterialia; Eslevier; vol. 2, No. 3 ; May 1, 2006; pp. 343-348; XP025150218.
International Preliminary Report on Patentability for Application PCT/CH2008/000200, mailed Nov. 11, 2010, nine pages.

*Primary Examiner* — Paul Marcantoni
(74) *Attorney, Agent, or Firm* — Rankin, Hill & Clark LLP

(57) ABSTRACT

Calcium phosphate particles having A) a specific surface area (SSA) larger than 0.1 m²/g; B) a mean diameter smaller than 5 mm; C) a Ca/P molar ratio superior to 0.95; and wherein D) said particles have been subjected as a last processing step to a heat treatment at a temperature superior to 400° C. for a period of time such that the specific surface area (SSA) of said particles after the heat treatment is not decreased by more than 10% compared to the SSA before said heat treatment.

39 Claims, 10 Drawing Sheets

CALCIUM PHOSPHATE PARTICLES AND HYDRAULIC CEMENTS BASED THEREON

FIELD OF THE INVENTION

The invention relates to calcium phosphate particles according to claim 1, a method for preparing said calcium phosphate particles according to claim 29, a mixture comprising calcium phosphate particles according to claim 31 and a hydraulic cement based on said calcium phosphate particles according to claim 33.

Most commercial calcium phosphate cements have to be used within minutes after mixing, because as soon as mixing is started, reaction occurs. As a result, the surgeon does not have the possibility to postpone injection by 20 minutes due to an unexpected reason.

SUMMARY OF THE INVENTION

It is an object of the invention to provide a calcium phosphate powders or granules having a much lower reactivity than conventional ones.

The invention solves the posed problem with calcium phosphate particles according to claim 1, a method for preparing said calcium phosphate particles according to claim 29, a mixture comprising calcium phosphate particles according to claim 31 and a hydraulic cement based on said calcium phosphate particles according to claim 33.

In a special embodiment said specific surface area (SSA) is not decreased by more than 2%.

In a further embodiment said particles have—at the uppermost surface layer with a maximal depth of 10 nm—a degree of crystallinity superior to 80%, preferably superior to 90%.

In another embodiment said maximum depth is 5 nm, preferably 2 nm.

In yet a further embodiment said particles have a degree of crystallinity—as determined by Rietveld analysis of XRD data—superior to 80%, preferably superior to 90%.

In another embodiment said degree of crystallinity is not increased by more than 20% by said thermal treatment.

In a further embodiment the phase of less than 10 weight-% of said particles is modified by said heat treatment.

In still another embodiment the hydraulic reactivity of said particles shows a delayed action after said heat treatment.

In a further embodiment the time required to reach the 10% normalized cumulated heat fraction of the reaction between said particles and water is postponed by at least 30 minutes by said heat treatment.

In another embodiment said heat treatment is performed above 450° C., preferably above 500° C.

In yet a further embodiment said heat treatment is performed below 900° C., preferably below 800° C.

In still another embodiment said heat treatment is performed below 650° C., preferably below 600° C.

In a further embodiment said heat treatment is performed for a duration of at least 15 minutes, preferably at least 1 hour.

In another embodiment said heat treatment is performed for a duration of at least 5 hours, preferably at least 24 hours.

In yet a further embodiment said particles have a mean particle diameter of less than 20 µm.

In still another embodiment said particles have a mean particle diameter of less than 15 µm, preferably less than 10 µm.

In a further embodiment said mean particle diameter is less than 5 µm, preferably less than 2 µm.

In another embodiment said particles have a specific surface area (SSA) larger than 0.2 m$^2$/g, preferably larger than 1.0 m$^2$/g.

In yet a further embodiment said particles have been admixed with hydroxyapatite seed crystals.

In still another embodiment said hydroxyapatite seed crystals are present in an amount of 1 to 20 weight-%, preferably of 2 to 10 weight-%, based on the amount of the calcium phosphate particles.

In a further embodiment said particles consist of alpha-tricalciumphosphate [α-TCP; α-Ca$_3$(PO$_4$)$_2$].

In another embodiment a mixture of 2 g of said particles with 1 mL of a 0.2 M solution of Na$_2$HPO$_4$ at 37° C. is releasing less than 10 J within one hour after mixing.

In yet a further embodiment said particles consist of beta-tricalciumphosphate [β-TCP; β-Ca$_3$(PO$_4$)$_2$].

In still another embodiment a mixture of 1.9 g of said particles with 0.1 g hydroxyapatite seed crystals and with 1 mL of a 0.2 M solution of Na$_2$HPO$_4$ adjusted at a pH of 6.0 at 37° C. is releasing less than 1 J within one hour after mixing.

In a further embodiment said particles consist of tetracalciumphosphate [Ca$_4$O(PO$_4$)$_2$].

In yet a further embodiment said particles consist of a mixture of at least two of the following substances:
a) alpha-tricalciumphosphate [α-TCP; α-Ca$_3$(PO$_4$)$_2$]
b) beta-tricalciumphosphate [β-TCP; β-Ca$_3$(PO$_4$)$_2$]
c) tetracalciumphosphate [Ca$_4$O(PO$_4$)$_2$].

In another embodiment said Ca/P molar ratio is inferior to 2.1.

In still another embodiment said Ca/P molar ratio is in the range of 1.4 to 1.55, preferably in the range of 1.47 to 1.52.

The method of preparing said calcium phosphate particles essentially comprises the steps of:
a) sintering a powder or reactive sintering of a mixture of powders containing calcium and phosphate ions in the required molar ratio at a temperature over 700° C.;
b) grinding or milling the sintered calcium phosphate to a mean particle diameter of less than 5 mm;
c) calcining the ground or milled calcium phosphate particles at a temperature in a range between 400° C. and 700° C. for a time period not leading to a phase transformation of said particles.

In a special embodiment of the method according to the invention the phase of less than 10 weight-% of said particles is modified by said heat treatment.

The mixture according to the invention allows to obtain cements setting according to a bimodal mode. This powder can be used to produce a hydraulic cement that is very liquid during mixing, viscous during application (for example after the reaction of 10% of the total powder consisting of un-passivated calcium phosphate) and hard after a few additional minutes (for example after the reaction of the remaining 90% of the powder consisting of passivated calcium phosphate).

In a special embodiment of the mixture the amount of non heat treated particles is less than 25 percent, preferably less than 10% based on the amount of heat treated particles The hydraulic cement comprises two components A and B, wherein component A comprises calcium phosphate particles according to one of the claims 1 to 28, a retarder for apatite crystal growth and water or an aqueous solution with a pH-value higher than 7; and component B comprises water r an aqueous solution with a pH-value lower than 7; and wherein components A and B after mixing are forming calcium-deficient hydroxyapatite.

In a special embodiment said pH-value is superior to 9, preferably superior to 10.

In a further embodiment the weight ratio NB of said component A and B is in the range of 2:1 to 10:1, preferably in the range of 3:1 to 8:1.

In another embodiment said retarder comprises a compound having at least two carboxylic groups. The carboxylic groups, e.g. as in citrate ions act as Ligand for the calcium ions at the phosphate surface.

In yet a further embodiment said component B comprises an acidic aqueous solution, preferably with a pH-value in the range of 4 to 5.

In still another embodiment said component B comprises diluted phosphoric acid or a solution of sodium hydrogen phosphate, monocalcium phosphate or monocalcium phosphate monohydrate.

In a further embodiment said hydraulic cement comprises three components A, B and C, wherein
component A comprises calcium phosphate particles according to one of the claims 1 to 21;
component B comprises water or an aqueous solution; and
component C comprises water or an aqueous solution with a pH-value lower than 7; and wherein
components A, B and C after mixing are forming calcium-deficient hydroxyapatite.

The advantage of the three-component cement—over the two-component cement—consists in the avoidance of any problems with powder stability during shelf-life. Moreover, several "activator" solutions (components C) can be provided to obtain a very fast setting mixture or a slower setting mixture. This provides the surgeon with the possibility to inject the cement even one hour after the first injection just by changing the cannula (=static mixer).

Surprisingly it has been found that calcining a reactive calcium phosphate powder (e.g. α-TCP, α-Ca$_3$(PO$_4$)$_2$) at a temperature superior to 400° C. and preferably in the range of 400-700° C. can markedly decrease its reactivity without leading to phase transformation (e.g. α-TCP into β-TCP) or sintering and hence agglomeration of the particles. This is particularly interesting because the traditional method to control the reactivity of a powder is either based on size (the smaller the particles, the more reactive) or the use of chemical additives (accelerators or retarders).

This can be achieved ideally in a temperature range between 500° C. to 600° C. For example, the time to start the reaction of an α-TCP powder placed in an aqueous solution can be increased from a few seconds to a few hours by applying a 1 h calcination step at 500° C. The mechanism of this phenomenon is probably related to a reduction of the surface defects since the powder dissolution requires surface defects to proceed.

Interestingly, the reactivity (or rather the absence of reactivity) is a function of the composition of the aqueous solution: whereas the use of pure water or a relatively basic aqueous solution leads to a strong difference of reactivity between uncalcined and calcined powder (typically from a few seconds to a few hours), the use of an acidic solution almost removes this effect.

Several ways can be used to determine the reactivity of a powder. For the purposes of the present invention a thermal method is used: the heat exchanged during the hydraulic reaction of a calcium phosphate powder is measured and analyzed to determine the powder reactivity. More specifically, an isothermal calorimeter (TAM Air Cement, Thermometric AB, Sweden) containing 8 separate measuring cells has been used to study the heat exchanged during and after mixing a calcium phosphate powder mixture with 1.0 mL of aqueous solution. For the measurements, 2.0 g of alpha-TCP particles and 1.0 mL of 0.2M Na$_2$HPO$_4$ solution were placed in the two sealed compartments of the mixing cell ("20 mL Admix Ampoule") at a temperature of 37° C., and the mixing cell was lowered into the calorimeter. When a constant (zero) signal was reached, the solution was injected into the calcium phosphate powder, and mixed therewith using the mixing rod. The measurements were terminated when a constant thermal signal was reached (typically after 1-7 days). At least three measurements are made per powder.

For beta-TCP, the testing solution should purposefully be a 0.2M Na$_2$HPO$_4$ solution whose pH value has been set to pH 6.0. For TetCP, the conditions should be the same as those of alpha-TCP.

To assess calcium phosphate cement (CPC) reactivity, it is assumed that the degree of reaction is proportional to the fraction of released heat. As a result, the evolution of the cumulated released heat is considered to be representative of the evolution of the degree of reaction. As cement setting normally occurs when about 10% of the powder has reacted, the powder reactivity is defined here as the point at which 10% of the total heat has been released.

α-TCP powders are generally obtained by sintering a 1:2 molar mixture of calcium carbonate (CaCO$_3$) and dicalcium phosphate anhydrous (CaHPO$_4$) at 1350° C. (Eq. 1), quenching in air and milling,

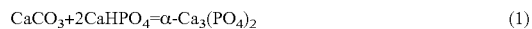

$$CaCO_3 + 2CaHPO_4 = \alpha\text{-}Ca_3(PO_4)_2 \quad (1)$$

During the setting reaction of TCP-based hydraulic CPC, two main reactions occur: [1] the exothermic dissolution of TCP and [2] the endothermic precipitation of calcium deficient hydroxyapatite (CDHA; Ca$_9$(HPO$_4$)(PO$_4$)$_5$OH) leading to [3] an exothermic global reaction (for α-TCP, this value is close to −133 kJ) and corresponds to a release heat amount of −143 J/g alpha-TCP:

$$3Ca_3(PO_4)_2 = 9Ca^{2+} 6PO_4^{3-} \quad [1]$$

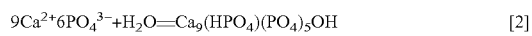

$$9Ca^{2+} 6PO_4^{3-} + H_2O = Ca_9(HPO_4)(PO_4)_5OH \quad [2]$$

$$3Ca_3(PO_4)_2 + H_2O = Ca_9(HPO_4)(PO_4)_5OH \quad [3]$$

When TetCP is placed in an aqueous solution, TetCP dissolves and precipitates as a mixture of hydroxyapatite (HA) and calcium hydroxide:

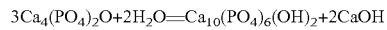

$$3Ca_4(PO_4)_2O + 2H_2O = Ca_{10}(PO_4)_6(OH)_2 + 2CaOH$$

The heat released during this reaction is −555 kJ.

For alpha-TCP powders or granules a heat treatment between 400° C. and 700° C. for a duration long enough to markedly decrease the hydraulic reactivity and short enough to prevent sintering (less than 10% decrease of the specific surface area) seems to be optimal. The time to reach 10% heat release when 2 g of powder/granules are mixed with 1 mL 0.2M Na$_2$HPO$_4$ solution at 37° C. is increased by more than 1 h due to calcination.

The above indicated values of −133 and −555 kJ represent the enthalpy of reaction. The negative sign means that heat is released during the reaction.

BRIEF DESCRIPTION OF THE DRAWINGS

Reactivity will be discussed with reference to the figures in which:

FIG. 2b is a graph showing typical release curves of the normalized cumulated released heat obtained from the release curves of FIG. 2a;

FIG. 1 illustrates typical release curves obtained by isothermal calorimetry with 2 g of α-TCP (α-Ca$_3$(PO$_4$)$_2$) granules (0.125-0.180 mm in size) and 1 mL of 1.0 mL of 0.2M Na$_2$HPO$_4$ solution. A positive value here corresponds to an exothermic reaction (the enthalpy of reaction is negative). Here, two curves are presented: α-TCP granules before (=not calcined) and after (=calcined) calcination at 500° C. for 24 h.

FIGS. 2a and 2b illustrate typical release curves obtained by isothermal calorimetry with 2 g of the α-TCP (α-Ca$_3$(PO$_4$)$_2$) granules (0.125-0.180 mm in size) and 1 mL of 1.0 mL of 0.2 M Na$_2$HPO$_4$ solution according to FIG. 1. Here, the cumulated released heat (FIG. 2a) and the normalized cumulated released heat (FIG. 2b) are shown. A positive value here corresponds to an exothermic reaction (the enthalpy of reaction is negative). Here, two curves are presented: α-TCP granules before and after calcination at 500° C. for 24 h.

FIG. 3 illustrates typical release curves obtained by isothermal calorimetry with 2 g of α-TCP (α-Ca$_3$(PO$_4$)$_2$) powder and 1 mL of 1.0 mL of 0.2M Na$_2$HPO$_4$ solution. A positive value here corresponds to an exothermic reaction (the enthalpy of reaction is negative). Here, five curves corresponding to five different powders/powder mixtures are presented: (i) an α-TCP powder that was obtained by sintering 1:2 molar mixture of calcium carbonate (CaCO$_3$) and dicalcium phosphate anhydrous (CaHPO$_4$) at 1350° C. (Eq 1), quenching in air and milling; (ii) the same powder after calcination at 500° C. for 1 h, (iii) the same powder as in (i) after calcination at 500° C. for 24 h, (iv) a 1:1 mixture of the α-TCP powder described in (i) and the powder described in (ii) and finally (v) a 1:9 mixture of the α-TCP powder described in (I) and the powder described in (ii).

Figure 4:
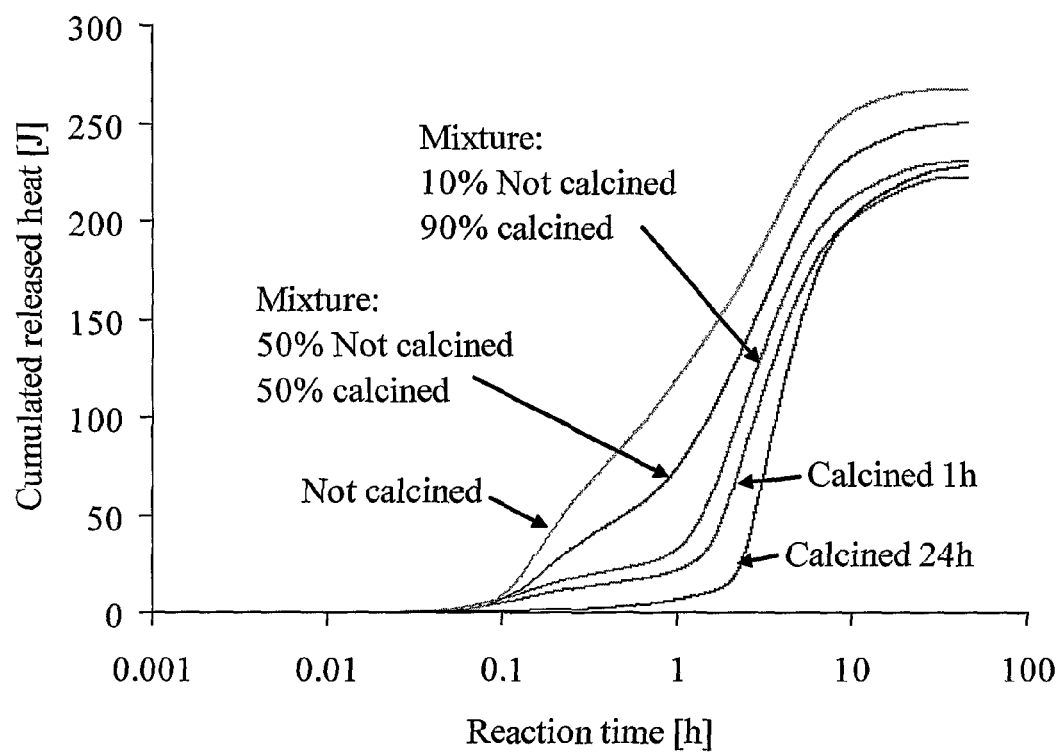
FIG. 4 is a graph showing release curves of the cumulated released heat obtained from the release curves of FIG. 3.

The latter curves were integrated and displayed in FIG. 4.

Figure 3:
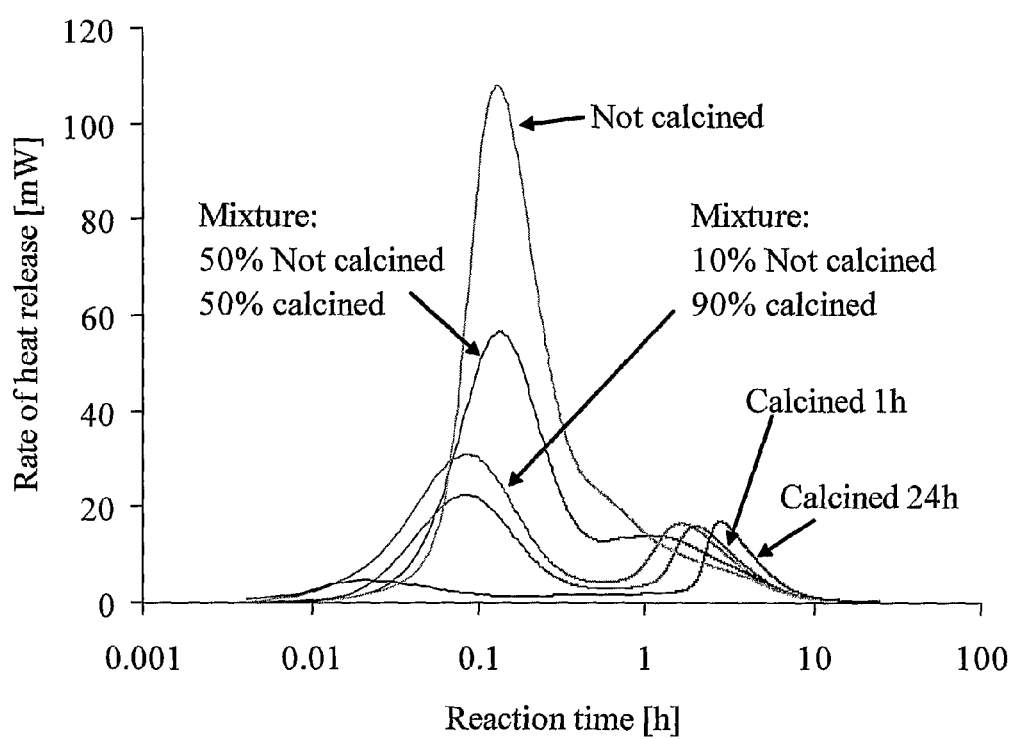
FIG. 3 is a graph showing typical release curves obtained by isothermal calorimetry with 2 g of α-TCP (α-Ca$_3$(PO$_4$)$_2$) powder and 1 mL of 0.2M Na$_2$HPO$_4$ solution.

FIG. 4 illustrates the cumulated heat released during the reaction of the 5 different α-TCP powders/powder mixtures with 1 mL of 1.0 mL of 0.2M Na$_2$HPO$_4$ solution according to FIG. 3. The curves presented in FIG. 4 are the integrals of the curves presented in FIG. 3. A different value at the end of the reaction means that a different amount of heat was released during the reaction. As shown here, calcining a powder leads to a decrease of the total heat released during the reaction.

Figure 5:
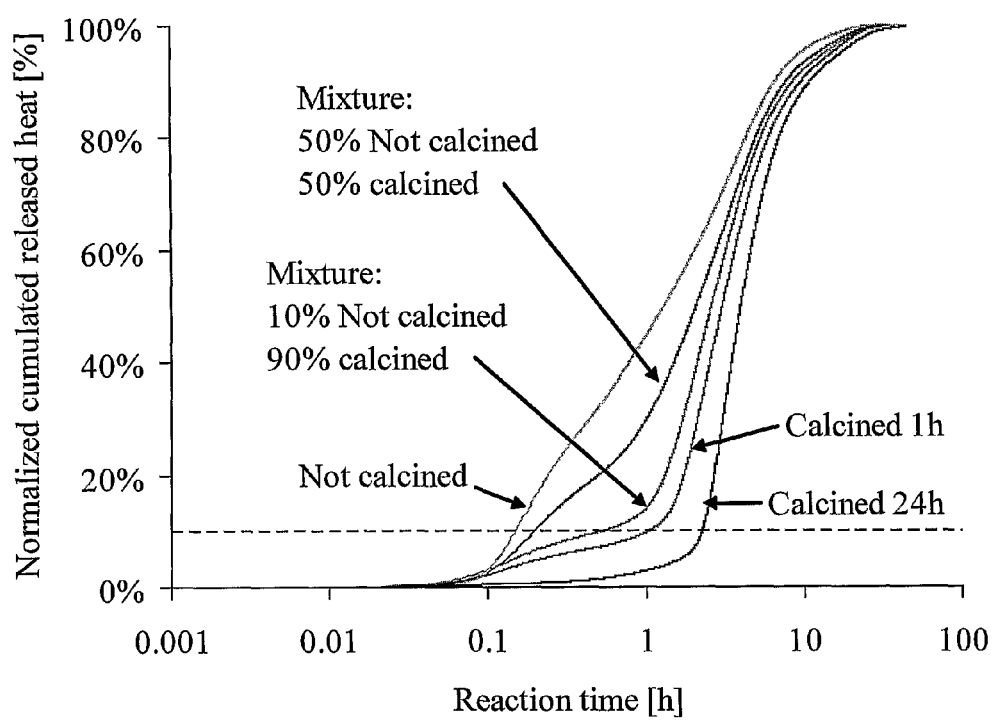
FIG. 5 is a graph showing the normalized cumulated released heat obtained from the release curves of FIG. 4.

Finally, the integrated curves were normalized to 100% and the reactivity defined as the point at which 10% of the heat was released during the reaction was determined (FIG. 5).

FIG. 5 illustrates the normalized cumulated heat released during the reaction of the 5 different α-TCP powders/powder mixtures with 1 mL of 1.0 mL of 0.2M Na$_2$HPO$_4$ solution according to FIGS. 3 and 4. The curves presented in FIG. 5 are the normalized curves presented in FIG. 4. The intersection between each of the five curves and the dashed line correspond to the powder reactivity. Here, the reactivity of the non-calcined powder was slightly higher than 0.2 h, whereas the same powder calcined during 24 h at 500° C. had a reactivity close to 2.2 h.

Figure 6:
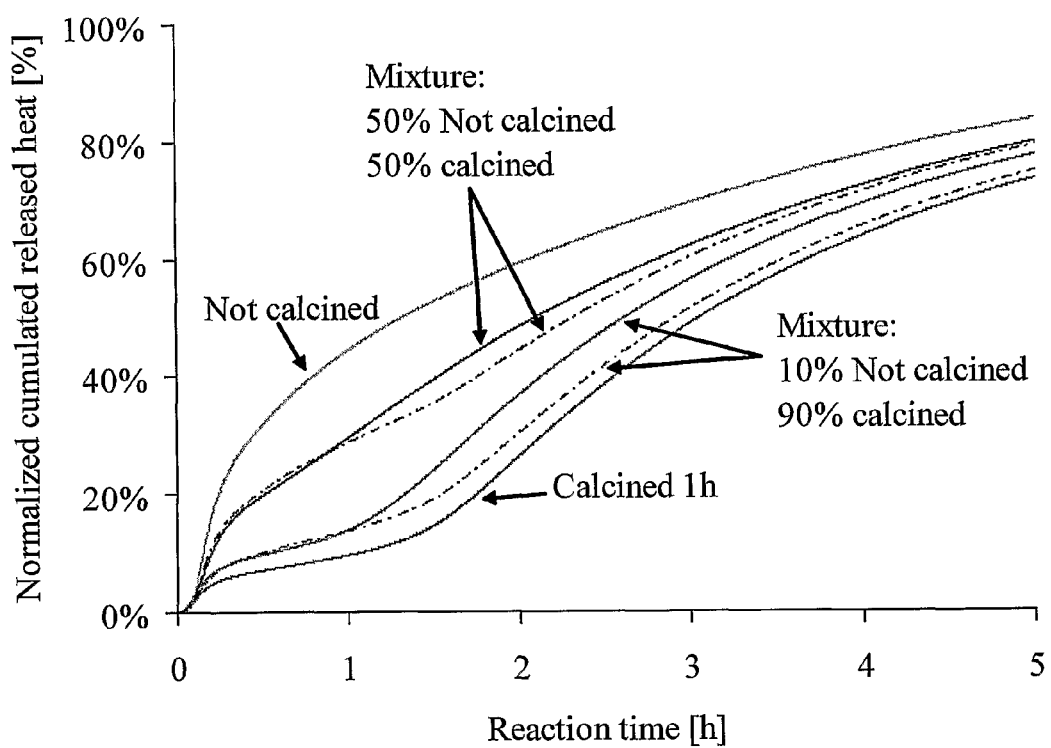
FIG. 6 is an enlargement of FIG. 5 showing a graph showing the normalized curves showing the cumulated heat released during the reaction of 2 g of α-TCP (α-Ca$_3$(PO$_4$)$_2$) powder and 1 mL of 1.0 mL of 0.2M Na$_2$HPO$_4$ solution.

FIG. 6 illustrates curves showing the normalized cumulated heat released during the reaction of 2 g of α-TCP (α-Ca$_3$(PO$_4$)$_2$) powder and 1 mL of 1.0 mL of 0.2M Na$_2$HPO$_4$ solution. Here, six curves are presented: (i) an α-TCP powder that was obtained by sintering 1:2 molar mixture of calcium carbonate (CaCO$_3$) and dicalcium phosphate anhydrous (CaHPO$_4$) at 1350° C. (Eq 1), quenching in air and milling; (ii) the same powder after calcination at 500° C. for 1 h, (iii) a 1:1 mixture of the α-TCP powder described in (i) and the powder described in (ii), (iv) a 1:9 mixture of the α-TCP powder described in (i) and the powder described in (ii), and finally two dashed lines corresponding to the 1:1 and 1:9 mixtures calculated based on the curves obtained for calcined and uncalcined powder, assuming that the reactions of calcined and uncalcined powders are additive.

Surprisingly, the reactivity of calcined powders was hardly affected by the presence of uncalcined powder. This was expressed by the fact that the thermal output of a 1:1 and 1:9 mixture of uncalcined and calcined powder could be well predicted by assuming that the thermal reaction of uncalcined and calcined powders are additive (FIG. 6). As a result, cement mixtures could be designed to present not only one but two main reaction peaks (FIG. 6). This could be of interest in applications where only a partial reaction should be achieved during a certain time (e.g. no reaction during mixing to have a fluid and hence easy-to-mix cement, partial reaction during application to have an adequate viscosity and final reaction within 10-20 minutes of reaction leading to hardening).

Figure 1:
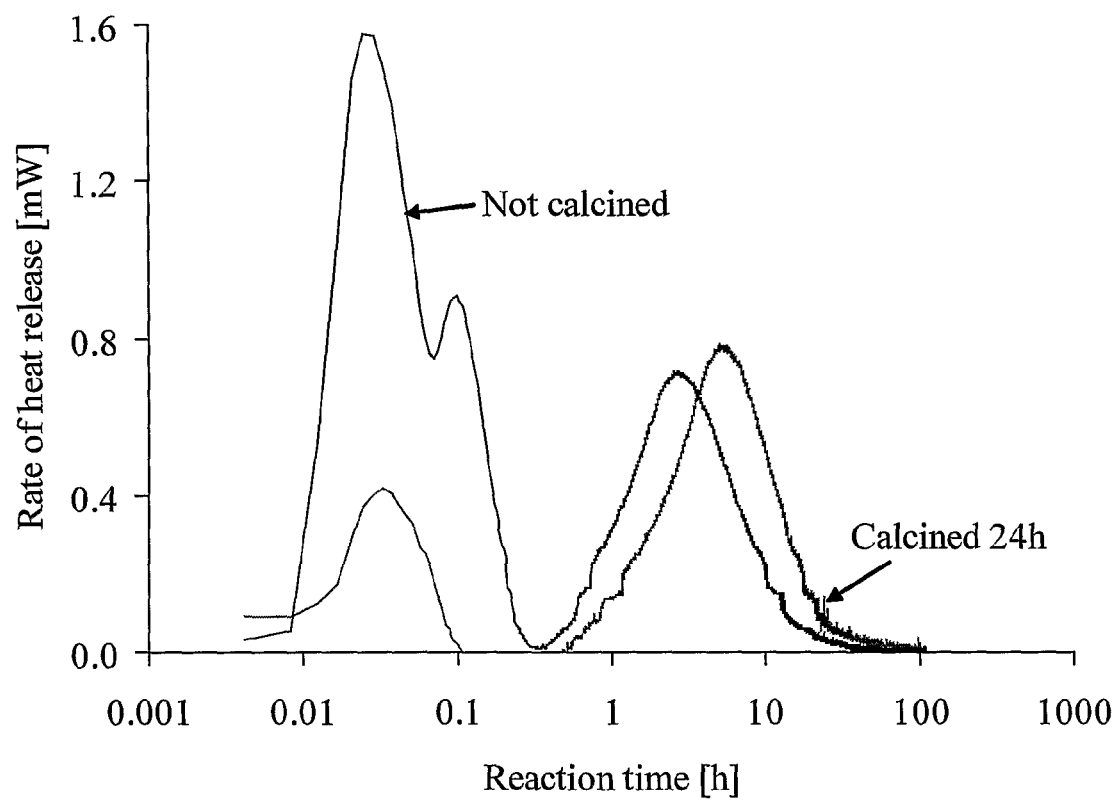
FIG. 1 is a graph showing typical release curves obtained by isothermal calorimetry with 2 g of α-TCP (α-Ca$_3$(PO$_4$)$_2$) granules (0.125-0.180 mm in size) and 1 mL of 1.0 mL of 0.2M Na$_2$HPO$_4$ solution.
Figure 2A:
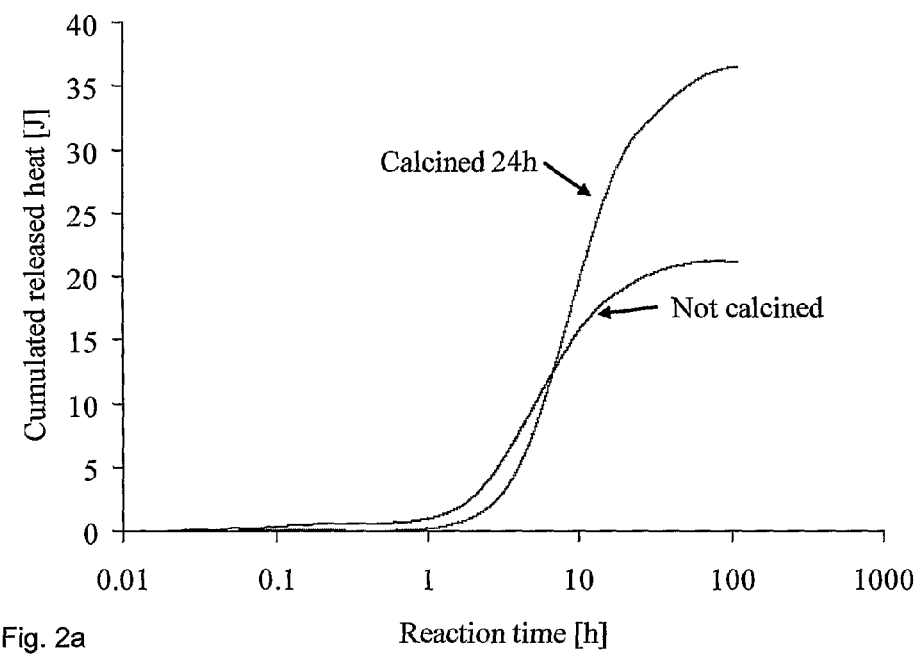
FIG. 2a is a graph showing typical release curves of the cumulated released heat obtained from the release curves of FIG. 1.
Figure 2B:
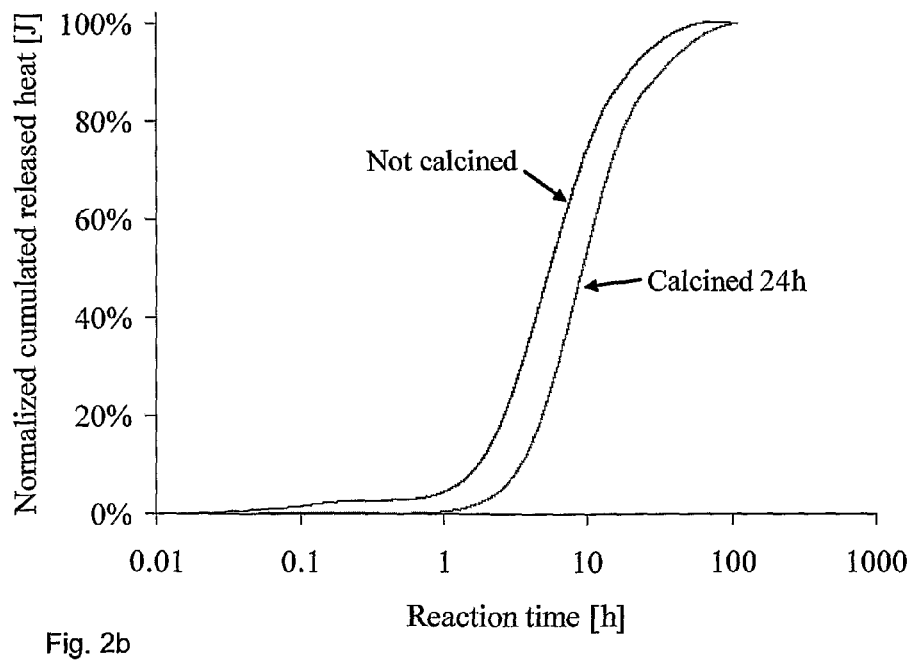
Figure 7:
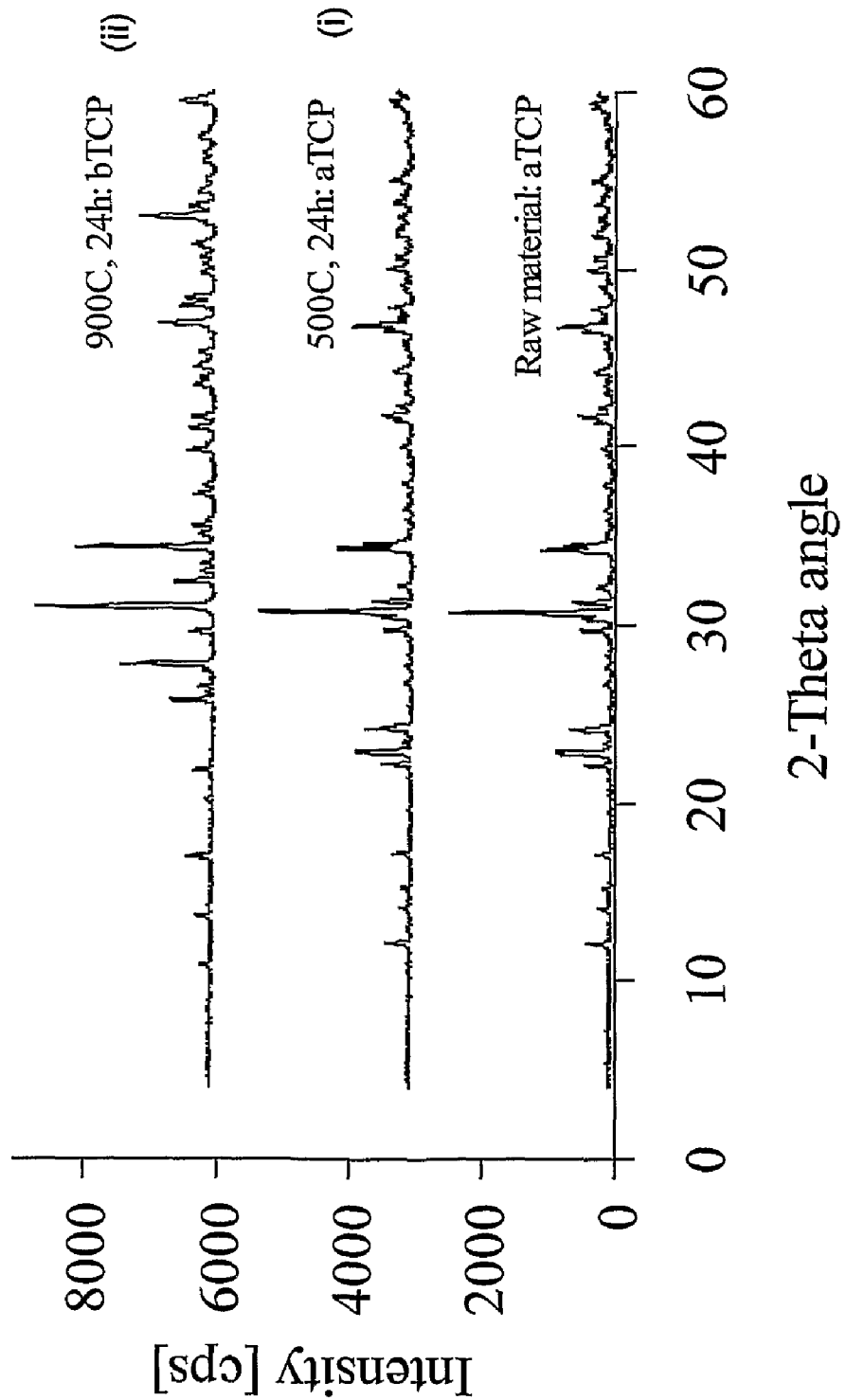
FIG. 7 is a graph illustrating X-ray diffraction data in case of the α-TCP (α-Ca$_3$(PO$_4$)$_2$) granules of FIG. 1 showing (1) the absence of spectrum change after calcination at 500° C. for 24 h and (ii) the change of composition after calcination at 900° C. for 24 h.

FIG. 7 illustrates X-ray diffraction data of the α-TCP granules according to FIG. 1, before and after calcination at 500° C. and 900° C. for 24 h (curves from bottom to top, respectively). The spectrum of α-TCP granules calcined 24 h at 500° C. is identical to that of the initial granules (i: absence of spectrum change after calcination). The α-TCP granules calcined 24 h at 900° C. do not present any α-TCP peaks anymore and consist of pure β-TCP (ii: change of composition after calcination).

Figure 8:
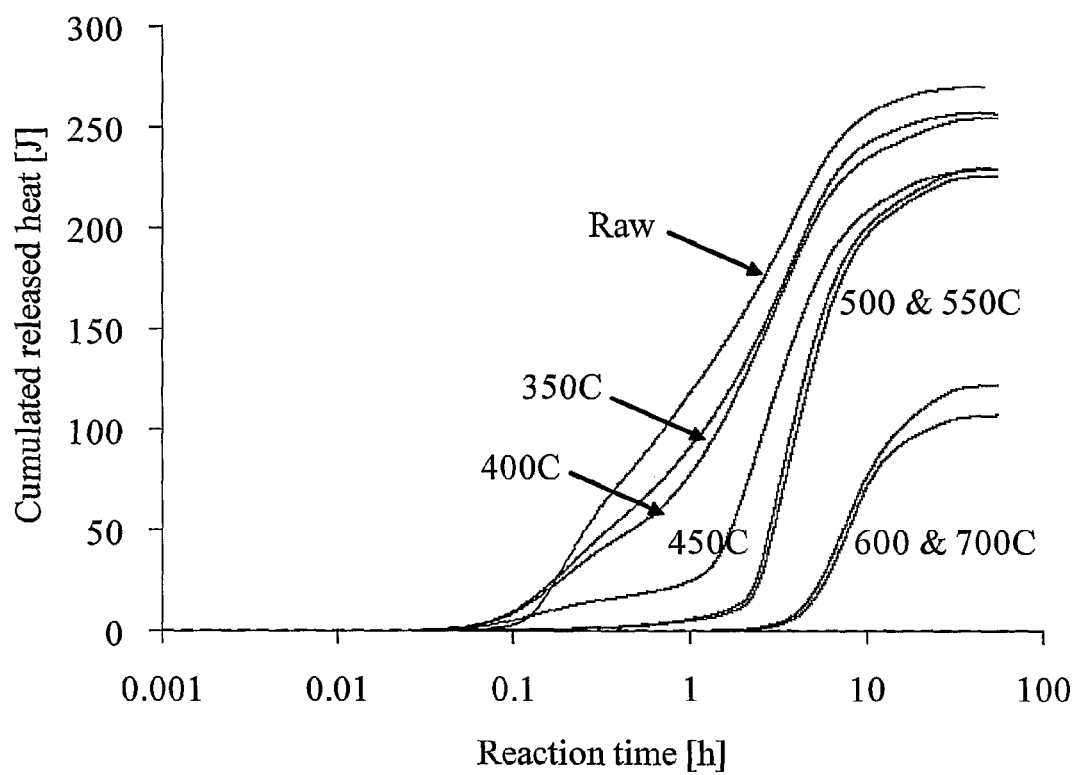
FIG. 8 is a graph showing release curves of the cumulated released heat obtained by isothermal calorimetry with a powder of α-TCP (α-Ca$_3$(PO$_4$)$_2$) with a mean size in volume of 6 µm.
Figure 9:
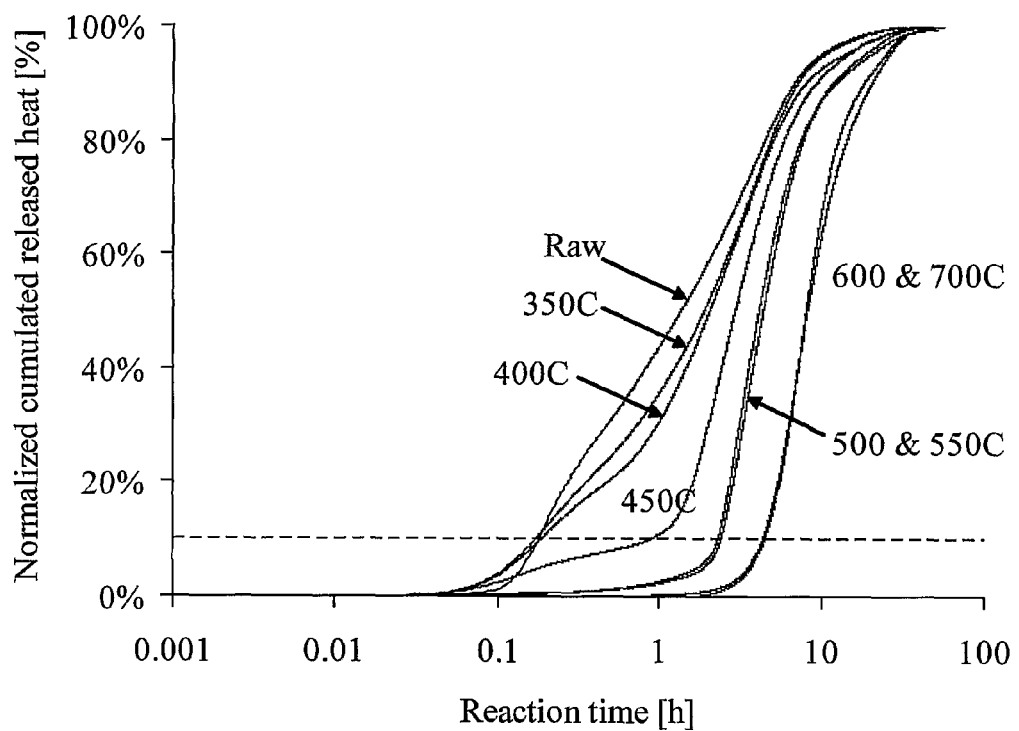
FIG. 9 is a graph showing the normalized cumulated released heat obtained from the release curves of FIG. 8.

FIGS. 8 and 9 illustrate graphs of data showing the effect of calcination temperature on the passivation of α-TCP powder with a mean size in volume of 6 µm. The α-TCP powder designated by "raw" was calcined for 24 h at the temperatures: 350° C., 400° C., 450° C., 500° C., 550° C., 600° C. and 700° C. The time to reach 10% cumulated released heat increased from roughly 0.2 h ("raw powder", 350° C., 400° C.) to 0.9 h (450° C.) and then 2.3 h (500, 550° C.; FIG. 4). The change of reactivity was correlated to a small decrease of the cumulated released heat due to a decrease of the mechanical strains within the powder (FIG. 3). Calcining at and above 600° C. led both to a further decrease of reactivity (FIGS. 3-4) and to an important decrease in total released heat (FIG. 3). From the present data, it appears that for a calcination duration of 24 h, the calcination temperature should be superior to 400° C. and inferior to 800° C. (practically no heat exchanged—data not shown here). A preferred range would be above 450° C. and below 600° C., because a quite extensive phase transformation occurs at 600° C. and 700° C. (almost half of the powder is transformed into β-TCP).

Figure 10:
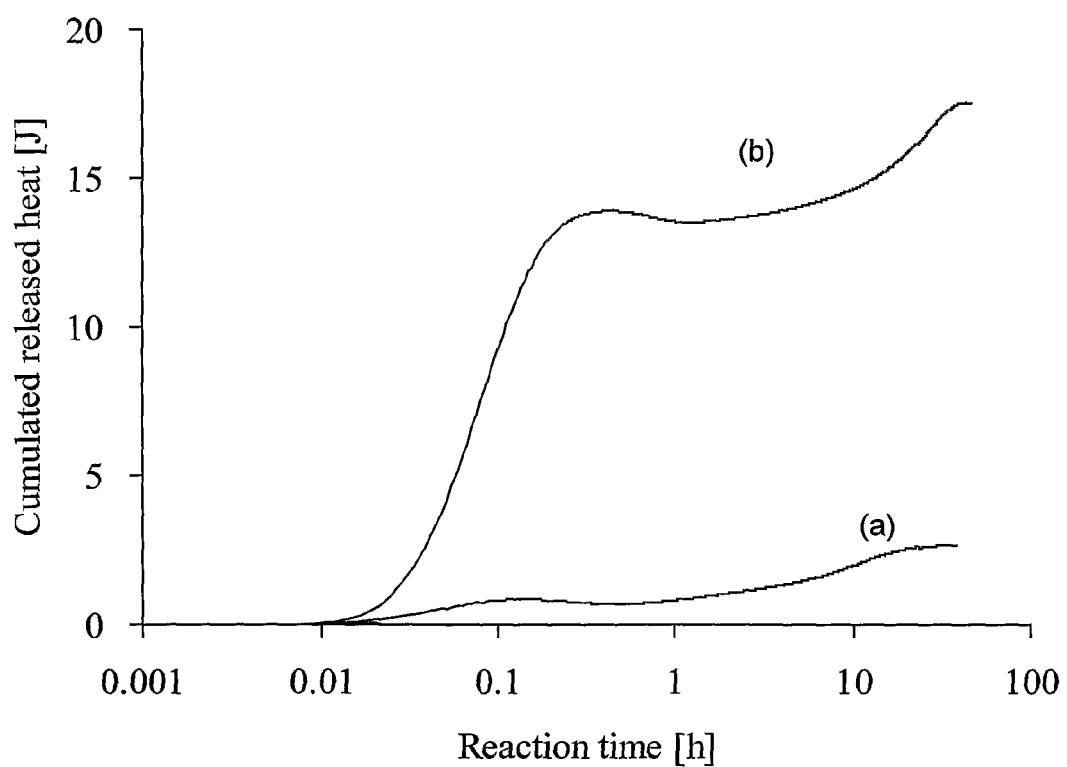
FIG. 10 is a graph showing release curves of the cumulated released heat obtained during the reaction of a mixture of 1.9 g of β-TCP powder and 0.1 g hydroxyapatite seed crystals with 1 mL of a 0.2 M solution of Na$_2$HPO$_4$.

FIG. 10 illustrates curves showing the cumulated heat released during the reaction of a mixture of 1.9 g of 1.9 g of β-TCP powder and 0.1 g hydroxyapatite seed crystals with 1 mL of a 0.2 M solution of $Na_2HPO_4$ adjusted at a pH of 6.0 at 37° C. The β-TCP powder (mean particle size in volume: 8 μm; Specific surface area (SSA): 0.9 $m^2/g$) was calcined at 600° C. for 5 h. The results indicate that the total amount of heat released during the reaction is markedly lower with calcined β-TCP powder compared to uncalcined β-TCP (FIG. 10): whereas this value was close to 9 J/g with uncalcined powder, it dropped to roughly 2 J/g with calcined β-TCP powder. The bottom (a) curve was obtained with calcined (or passivated) β-TCP powder. The top curve (b) was obtained with uncalcined β-TCP powder. Here, only one curve is shown per composition (4 measurements were done per composition)

Further examples will illustrated the invention more in detail.

EXAMPLE 1

This example describes the use of a cement consisting of two components: (A) a mixture of 10 g of α-tricalcium phosphate powder (α-TCP, $α-Ca_3(PO_4)_2$) and 3.5 mL of 0.05M sodium citrate solution and (B) 0.5 mL of $NaH_2PO_4$ 0.1 M solution.

The α-TCP powder was obtained by sintering a 1:2 molar mixture of calcium carbonate (CC; $CaCO_3$) and dicalcium phosphate (DCP; $CaHPO_4$) at 1350° C. for 4 h (reaction [1]) followed by rapid quenching in air. The sintered solid was then milled to obtain a powder with a mean particle size (in volume) of 7.6 μm. Finally, the powder was calcined at 500° C. for 24 h resulting in a specific surface area of 1.5 $m^2/g$ of the particles. No significant change of the SSA, crystallinity (95%) and crystalline composition (>99% α-TCP) was detected during calcination.

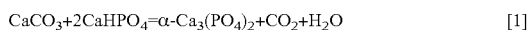
$CaCO_3+2CaHPO_4=α-Ca_3(PO_4)_2+CO_2+H_2O$ [1]

Despite the fact that α-TCP is known to react with water to form calcium-deficient hydroxyapatite (CDHA; $Ca_9(PO_4)_5(HPO_4)OH$; reaction [2]), this reaction does not take place in component A due to two factors: (i) α-TCP powder was calcined at 500° C. for 24 h. This thermal treatment passivates the powder and hence hinders its reaction, and (ii) the mixing liquid contains an inhibitor for CDHA crystal growth. The combination of both features is essential to obtain a paste stable during years of storage.

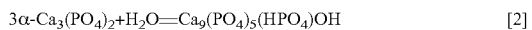
$3α-Ca_3(PO_4)_2+H_2O=Ca_9(PO_4)_5(HPO_4)OH$ [2]

To initiate the cement reaction and hence hardening, components A and B should be mixed together. Several methods can be used such as with a bowl and a spatula. However, the most convenient method is to use a static mixer. Mixing occurs during injection.

EXAMPLE 2

This example describes the use of a cement consisting of three components: (A) 10 g of α-tricalcium phosphate powder (α-TCP, $α-Ca_3(PO_4)_2$), (B) 4 mL of deionized water and (C) 0.5 mL of $NaH_2PO_4$ 0.1M solution.

The α-TCP powder was obtained by sintering a 1:2 molar mixture of calcium carbonate (CC; $CaCO_3$) and dicalcium phosphate (DCP; $CaHPO_4$) at 1350° C. for 4 h (reaction [1]) followed by rapid quenching in air. The sintered solid was then intensively milled in a planetary mill to obtain a powder with a mean particle size (in volume) of 2.5 μm. The specific surface area of the powder was 2.4 $m^2/g$. Finally, the powder was calcined at 560° C. for 10 h.

No significant change of the SSA, crystallinity (95%) and crystalline composition (>99% α-TCP) was detected during calcination.

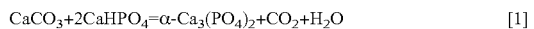
$CaCO_3+2CaHPO_4=α-Ca_3(PO_4)_2+CO_2+H_2O$ [1]

To use the cement, the first step is to mix component A and B during 60 seconds using a bowl and a spatula. A mechanical mix can also be used here. The resulting paste is then placed into a syringe. This mixture is stable during many hours, meaning that the hydraulic reaction of α-TCP into calcium-deficient hydroxyapatite (CDHA; $Ca_9(PO_4)_5(HPO_4)OH$; reaction [2]) does not occur, or occurs very slowly.

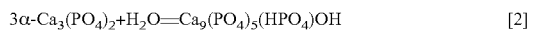
$3α-Ca_3(PO_4)_2+H_2O=Ca_9(PO_4)_5(HPO_4)OH$ [2]

In a second step, the paste obtained by mixing A and B together is mixed with component C using a static mixer. Reaction [2] takes place rapidly after mixing the paste with component C due to the slight acidity of component C and the presence of phosphate ions, both factors known to trigger the hydraulic reaction.

EXAMPLE 3

β-TCP powder was obtained by reactive sintering at a 2:1 molar mixture of $CaHPO_4$ and $CaCO_3$ at 1100° C. for 10 h. The powder was then ground per hand with a pestle in a mortar and then a planetary mill for 4×15 minutes (400 RPM, 100 beads of $ZrO_2$ 100 g powder). The resulting powder (mean particle size in volume: 2 μm; Specific surface area (SSA): 4.1 $m^2/g$) was calcined at 600° C. for 5 h. During calcination, no change of mean particle size, crystallinity (65%), crystalline composition and SSA could be detected. The β-TCP powder and the hydroxyapatite seed crystals were tested in an isothermal calorimeter using the following conditions:

1.9 g β-TCP powder 0.1 g hydroxyapatite Merck (No 2196)

1 mL $Na_2HPO_4$ 0.2M solution (pH value adjusted at pH 6.0 using HCl 1M solution)

The two powder components were mixed in advance. The powder mixture and the liquid were placed in the two compartments of the so-called "Admix Cell", itself placed within the calorimeter for approximately 1 h 30 until a constant signal was obtained (indicative that the temperature of both components had reached 37° C., the testing temperature). After that time, the liquid was injected into the powder and the two components were mixed with the mixing rod present in the "Admix Cell". The calorimetric signal was measured until a constant null value was obtained (generally more than 2 days of reaction).

The results indicated that the total amount of heat released during the reaction was markedly lower with calcined β-TCP powder compared to uncalcined β-TCP.

EXAMPLE 4

Calcium Phosphate Cement Made of Two Components

A: 14.6 g tetracalcium phosphate powder (Ca/P=2.00; mean size in volume: 15 microns, specific surface area: 0.6 m²/g, 98% crystalline; calcined under nitrogen for 4 h at 500° C.

TetCP decomposes to hydroxyapatite and CaO in humid conditions) in 6.5 mL $Na_3C_6H_5O_7$ 0.1M solution B: 5.4 g dicalcium phosphate ($CaHPO_4$; mean size in volume: 2.3 microns, SSA: 5.8 m²/g, >95% crystalline) in 3 mL $H_3PO_4$ 0.02M solution Each of the two components is stored in a separate syringe. The two syringes are fixed to a static mixer, and cement mixing and hardening is triggered by applying a pressure on the plunger of the two syringes.

The end product of the reaction is a hydroxyapatite.

While various descriptions of the present invention are described above, it should be understood that the various features can be used singly or in any combination thereof. The scope of the present invention is accordingly defined as set forth in the appended claims.

What is claimed is:

1. Calcium phosphate particles having
   A) a specific surface area (SSA) larger than 0.1 m²/g;
   B) a mean diameter smaller than 5 mm;
   C) a Ca/P molar ratio superior to 0.95; and wherein
   D) said particles have been subjected as a last processing step to a heat treatment at a temperature superior to 400° C. for a period of time such that the specific surface area (SSA) of said particles after the heat treatment is not decreased by more than 10% compared to the SSA before said heat treatment.

2. The calcium phosphate particles according to claim 1, wherein said SSA is not decreased by more than 2%.

3. The calcium phosphate particles according to claim 1, wherein said particles have—at an uppermost surface layer with a maximal depth of 10 nm—a degree of crystallinity superior to 80%.

4. The calcium phosphate particles according to claim 3, wherein said maximum depth is 5 nm.

5. The calcium phosphate particles according to claim 1, wherein said particles have a degree of crystallinity—as determined by Rietveld analysis of XRD data—superior to 80%.

6. The calcium phosphate particles according to claim 3, wherein said degree of crystallinity is not increased by more than 20% by said heat treatment.

7. The calcium phosphate particles according to claim 1, wherein the phase of less than 10 weight-% of said particles is modified by said heat treatment.

8. The calcium phosphate particles according to claim 1, wherein the hydraulic reactivity of said particles shows a delayed action after said heat treatment.

9. The calcium phosphate particles according to claim 1, wherein the time required to reach the 10 normalized cumulated heat fraction of the reaction between said particles and water is postponed by at least 30 minutes by said heat treatment.

10. The calcium phosphate particles according to claim 1, wherein said heat treatment is performed above 450° C.

11. The calcium phosphate particles according to claim 1, wherein said heat treatment is performed below 900° C.

12. The calcium phosphate particles according to claim 11, wherein said heat treatment is performed below 650° C.

13. The calcium phosphate particles according to claim 1, wherein said heat treatment is performed for a duration of at least 15 minutes.

14. The calcium phosphate particles according to claim 13, wherein said heat treatment is performed for a duration of at least 5 hours.

15. The calcium phosphate particles according to claim 1, wherein said particles have a mean particle diameter of less than 20 μm.

16. The calcium phosphate particles according to claim 15, wherein said particles have a mean particle diameter of less than 15 μm.

17. The calcium phosphate particles according to claim 16, wherein said mean particle diameter is less than 5 μm.

18. The calcium phosphate particles according to claim 1, wherein said particles have a specific surface area (SSA) larger than 0.2 m²/g.

19. The calcium phosphate particles according to claim 1, wherein said particles have been admixed with hydroxyapatite seed crystals.

20. The calcium phosphate particles according to claim 19, wherein said hydroxyapatite seed crystals are present in an amount of 1 to 20 weight % based on the amount of the calcium phosphate particles.

21. The calcium phosphate particles according to claim 1, wherein said particles consist of alpha-tricalciumphosphate [α-TCP; α-$Ca_3(PO_4)_2$].

22. The calcium phosphate particles according to claim 21, wherein a mixture of 2 g of said particles with 1 mL of a 0.2 M solution of $Na_2HPO_4$ at 37° C. is releasing less than 10 J within one hour after mixing.

23. The calcium phosphate particles according to claim 1, wherein said particles consist of beta-tricalciumphosphate [β-TCP; β-$Ca_3(PO_4)_2$].

24. The calcium phosphate particles according to claim 23, wherein a mixture of 1.9 g of said particles with 0.1 g hydroxyapatite seed crystals and with 1 mL of a 0.2 M solution of $Na_2HPO_4$ adjusted at a pH of 6.0 at 37° C. is releasing less than 1 J within one hour after mixing.

25. The calcium phosphate particles according to claim 1, wherein said particles consist of tetracalciumphosphate [$Ca_4O(PO_4)_2$].

26. The calcium phosphate particles according to claim 1, wherein said particles consist of a mixture of at least two of the following substances:
   a) alpha-tricalciumphosphate [α-TCP; α-$Ca_3(PO_4)_2$]
   b) beta-tricalciumphosphate [β-TCP; β-$Ca_3(PO_4)_2$]
   c) tetracalciumphosphate [$Ca_4O(PO_4)_2$].

27. The calcium phosphate particles according to claim 1, wherein said Ca/P molar ratio is inferior to 2.1.

28. The calcium phosphate particles according to claim 27, wherein said Ca/P molar ratio is in the range of 1.4 to 1.55.

29. A method of preparing said calcium phosphate particles according to claim 1, comprising the following steps:
   a) sintering a powder or reactive sintering of a mixture of powders containing calcium and phosphate ions in the required molar ratio at a temperature over 700° C.;
   b) grinding or milling the sintered calcium phosphate to a mean particle diameter of less than 5 mm;
   c) calcining the ground or milled calcium phosphate particles at a temperature in a range between 400° C. and 700° C. for a time period not leading to a phase transformation of said particles.

30. The method according to claim 29, wherein the phase of less than 10 weight-% of said particles is modified by said heat treatment.

31. A mixture comprising calcium phosphate particles according to claim 1 in admixture with calcium phosphate particles which have not been subjected to said heat treatment according to step D of claim 1.

32. The mixture according to claim 31, wherein the amount of non heat treated particles is less than 25 percent based on the amount of heat treated particles.

33. A hydraulic cement comprising two components A and B, wherein
component A comprises calcium phosphate particles according to claim 1, a retarder for apatite crystal growth and water or an aqueous solution with a pH— value higher than 7; and
component B comprises water or an aqueous solution with a pH-value lower than 7; and wherein
components A and B after mixing are forming calcium-deficient hydroxyapatite.

34. The hydraulic cement according to claim 33, wherein said pH-value is superior to 9.

35. The hydraulic cement according to claim 33, wherein the weight ration A/B of said component A and B is in the range of 2:1 to 10:1.

36. The hydraulic cement according to claim 33, wherein said retarder comprises a compound having at least two carboxylic groups.

37. The hydraulic cement according to claim 33, wherein said component B comprises an acidic aqueous solution, preferably with a pH-value in the range of 4 to 5.

38. The hydraulic cement according to claim 33, wherein said component B comprises diluted phosphoric acid or a solution of sodium hydrogen phosphate, monocalcium phosphate or monocalcium phosphate monohydrate.

39. The hydraulic cement comprising three components A, B and C, wherein
component A comprises calcium phosphate particles according to claim 1;
component B comprises water or an aqueous solution; and
component C comprises water or an aqueous solution with a pH-value lower than 7; and wherein
components A, B and C after mixing are forming calcium-deficient hydroxyapatite.

* * * * *